3,707,547
MANUFACTURE OF ADIPONITRILE
Stephen Frederick Bush and Michael John Shires, Reading, and Frank Johnson and Richard Anthony Williams, Manchester, England, assignors to Imperial Chemical Industries Limited, London, England
Filed June 29, 1970, Ser. No. 50,610
Claims priority, application Great Britain, Aug. 6, 1969, 39,340/69
Int. Cl. C07c 121/10, 121/26
U.S. Cl. 260—465.8
6 Claims

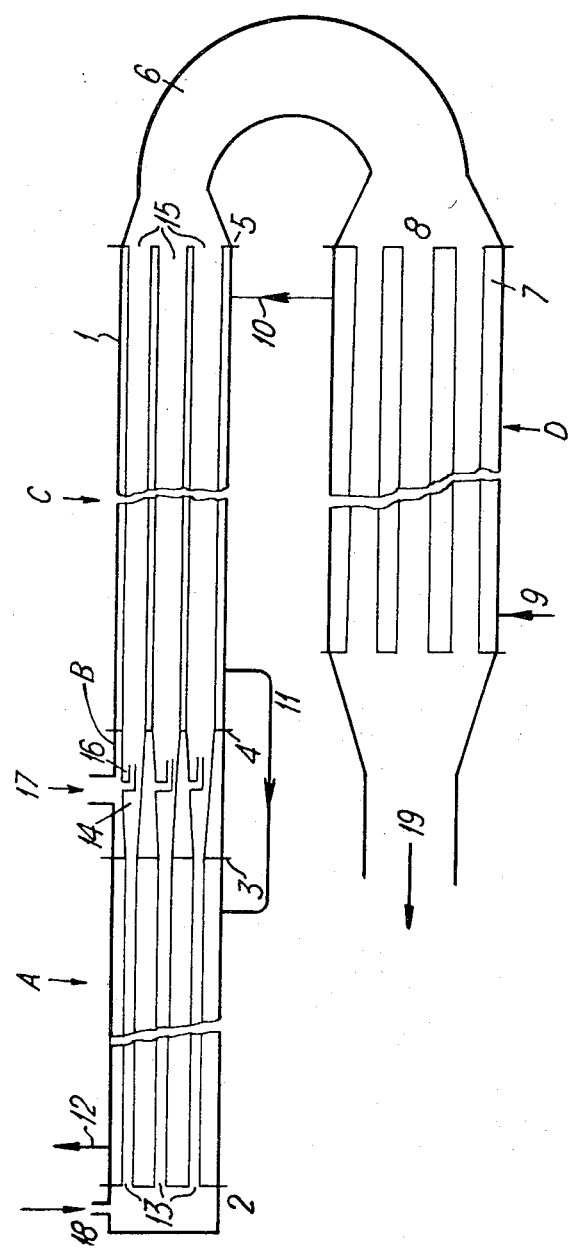

ABSTRACT OF THE DISCLOSURE

Vaporising a heat sensitive substance by passage through a heated duct while blowing a carrier gas along the axis so as to maintain annular flow of liquid until most of it is vaporised and then continuing heat supply to complete the vaporisation. Particularly applicable to vaporisation of adipic acid into ammonia preliminary to adiponitrile manufacture.

---

This invention relates to a process for vaporising a heat-sensitive liquid and more particularly to a process for vaporising adipic acid and reacting the vapour with ammonia to produce adiponitrile.

It is known to manufacture adiponitrile, an intermediate used in the manufacture of nylon 6,6 (polyhexamethyleneadipamide) by contacting a mixture of adipic acid vapour and ammonia with a catalyst. In operating this process commercially difficulty is encountered in vaporising the adipic acid without attendant decomposition with the production of cyclopentanone and other compounds, as well as tars and carbon. Such decomposition, as well as reducing the yield of adiponitrile, results in an impure product which requires expensive purification procedures and gives rise also to problems through deposition in the vaporisation apparatus, in the catalyst bed and in conduits. Vaporiser design has hitherto aimed at rapid vaporisation as a means of minimising decomposition.

According to the invention a process for vaporising a heat-sensitive substance comprises causing said substance in liquid form to flow through a heated duct, passing a carrier gas concurrently with the liquid along the axis of said duct at such a rate as to maintain the liquid in annular flow along the walls of the duct for a distance in which most of the liquid becomes vaporised and thereafter continuing to supply heat to the gas/liquid mixture to complete substantially the vaporisation.

Conveniently the liquid entering the heated duct may be preheated to a temperature at which degradation is negligible, for example to 250° C. to 300° C. in the case of adipic acid.

The temperature to which the heat-sensitive substance in liquid form heated in the process of the invention is desirably the lowest temperature at which vaporisation will take place at an effective rate, and in the case of adipic acid vaporising into ammonia this is found to be about 300° C. To maintain heat transfer into the liquid the walls of the duct must be heated to a temperature higher than that of the liquid and desirably just sufficient to keep the liquid at its lowest temperature for vaporisation at an effective rate. For adipic acid vaporising into ammonia, desirable wall temperatures are 340–380° C.

For greater efficiency the carrier gas also may be preheated, and its initial temperature may be higher than that at which vaporisation proceeds. When ammonia is used as a carrier gas for vaporising adipic acid its initial temperature may advantageously be from 350° to 400° C.

The velocity of passage of the carrier gas should be less than the velocity at which considerable quantities of spray are formed, since the liquid must be maintained in annular flow so that vaporisation proceeds by transfer of heat at comparatively low temperature from the walls of the duct.

For efficient vaporisation the mass flow rate in pounds per hour of carrier gas ($x$) and of liquid ($y$) flowing along the duct, should be related to the internal diameter of the duct ($z$) in inches by the following formulae:

(a) In the case of a gas of density $d$ pounds per cubic foot at inlet and a liquid of viscosity $\mu$ centipoises, density $D$ pounds per cubic foot and surface tension $\delta$ dynes per centimeter at inlet the limiting relationships for most efficient vaporisation are $$\frac{xy^2\mu^{2/3}}{\delta^2 D^2 d^{1/2}} > 0.13 z^6$$

$$\frac{x}{dz^2} < 5900$$

(b) In the case of adipic acid liquid and ammonia gas at inlet pressure P pounds per square inch $$xy^2 > 39{,}000 z^6$$

$$\frac{x}{Pz^2} < 8$$

As vaporisation proceeds, the annular flow of liquid decreases in thickness and is eventually broken. Thereafter the liquid flows in wave or rivulet form, with some formation of droplets which are carried along by the gas. Although it is possible to counteract the breakdown of annular flow to some extent by decreasing the cross section of the duct this causes an undesirable pressure drop. To complete the vaporisation to the desired extent further heating after breakdown of the annular flow may be accomplished by continued passage along an extension of the heated duct. Desirably however the cross section of the duct in which this further heating takes place should be greater than that of the duct used for annular flow of liquid. It is found that deposition of solid degradation products markedly increases after the breakdown of annular flow, and the increase in cross-section allows this deposition to take place in a wide part of the apparatus where it has least effect on heat transfer and on pressure drops inside the duct.

To extend the intervals between cleaning of the apparatus the temperature of the duct walls may be raised slightly when deposition of solid causes the heat transfer resistance to become increased. With adipic acid for example the temperature may be raised by about 15° C.

It is a feature of the invention to manufacture adiponitrile by producing a mixture of adipic acid vapour and ammonia using the process hereinbefore defined and contacting said mixture with a catalyst in known manner. Degradation of adipic acid in such a process can be less than 0.5% whereas with existing methods of vaporisation degradation of about 3% is common.

The process hereinbefore defined may find other uses, however. It may for example be used as a means of distilling heat-sensitive compounds in superheated steam. The mixture of acids known as "nylon waste acids," consisting mainly of adipic, glutaric and succinic acids, which is a byproduct of nylon manufacture may be distilled in this way.

The invention will now be described with reference to a specific embodiment with the aid of the accompanying drawing showing in section an apparatus suitable for producing a mixture of adipic acid vapour and ammonia for conversion to adiponitrile.

In the embodiment shown in the drawing the apparatus comprises an adipic acid preheater section A, an ammonia inlet section B, a main vaporiser section C and a superheater section D. Sections A, B and C are formed by a continuous horizontal cylindrical shell 1 housing a plurality of horizontal tubes. Within the shell these tubes are supported by circular plates 2, 3, 4 and 5 which seal off the sections from each other so that the shell portions between 2 and 3 and between 4 and 5 can be used as heating jackets. A semicircular open conduit 6 connects the main vaporiser section C with superheater D which also consists of a cylindrical shell 7 housing a plurality of tubes 8 and is conveniently situated below C to facilitate circulation of heating fluid by the pipe system 9, 10, 11, 12.

In Section B the horizontal tubes 13, from Section A are widened out by enlargement portions 14 to join on to wider horizontal tubes 15 which pass through Section C. Each of the enlargement portions 14 is fitted with an internal nozzle 16 by which ammonia is directed axially along the tubes 15. An ammonia supply pipe for Section B is fitted to the shell at 17. Inlet means for admitting liquified adipic acid into Section A are provided at 18 and an exit 19 for vaporised adipic acid/ammonia is provided at the end of Section D. In use this may be connected to a catalyst bed of known type for conversion of the mixed vapours to adiponitrile.

The number of tubes and dimensions of the apparatus will depend upon the scale upon which it is desired to operate. Thus for example the shell 1 may be 14 inches in diameter, to house 37 tubes. Preheated Section A may be 26 feet long, housing tubes of half inch diameter: main vaporiser Section C may be 24 feet long, housing tubes of one and a quarter inch diameter: superheater Section D may be 14 feet long, housing tubes of one and a half inch diameter. An apparatus of such dimensions operates satisfactorily for vaporising adipic acid with ammonia gas using the following temperatures:

|  | ° C. |
|---|---|
| Adipic acid inlet temperature | 170 |
| Adipic acid temperature at B | 256 |
| Ammonia inlet temperature | 380 |
| Heating fluid temperatures: |  |
| At inlet into D | 360 |
| Between D and C | 356 |
| Between C and A | 344 |
| At exit | 339 |

Adipic acid throughput in such an apparatus may be at the rate of 8000 pounds per hour and ammonia throughput at the rate of 8000 pounds per hour.

Operating under these conditions annular flow of liquid adipic acid is maintained along almost the entire length of the pipes 15 in Section C and in consequence solid deposition is almost entirely confined to the tubes in Section D and the bend 6. The amount of degradation of the adipic acid is small, being less than 0.5%.

Although in the embodiment shown in the drawings all tubes are horizontal this need not be the case, for the tubes may be inclined or even vertical. When the tubes of the vaporiser are non-horizontal however it is desirable for efficient working that the liquid should flow through them in a downward direction.

What is claimed is:
1. In the process for the manufacture of adiponitrile from adipic acid vapors and ammonia in the presence of a catalyst by contacting said adipic acid vapors and ammonia the improvement which comprises forming a vaporized mixture of adipic acid into ammonia gas in a tubular system free of movable parts without essentially forming solid deposits comprising:
   introducing into one end of the heated tubular system hot liquid adipic acid at a temperature below its vaporization temperature and that of the heated tube(s);
   introducing into an enlarged portion of the tubular system hot ammonia gas so as to effect axial flow of the ammonia gas and concurrent annular flow of the liquid adipic acid along the hot tube(s) of the tubular system, the flow of said fluid mixture being horizontal or downward, while the adipic acid is vaporized into the ammonia and the vaporous mixture of adipic acid and ammonia is recovered at the terminal end of the tubular system and further reacting said mixture to form adiponitrile.

2. The process of claim 1 wherein the adipic acid is introduced into the system at a temperature of from 250° C. to 300° C., the ammonia gas being introduced at a temperature of from 350° C. to 400° C. and the wall(s) of the tube(s) maintained at a temperature of from 340° C. to 380° C.

3. The process of claim 1 wherein the hot ammonia gas is introduced into the system through an internal nozzle fitted into the enlarged portion of said tubular system.

4. The process of claim 3 wherein the flow of the fluids is horizontal.

5. The process of claim 3 wherein the mass flow rate in pounds/hour of the ammonia gas ($x$) and liquid adipic acid ($y$) is related to the internal diameter ($z$) of the tube(s) in inches so that $xy^2 > 39000z^6$ and $x/Pz^2 < 8$ where P is the inlet pressure of the ammonia in pounds/square inch.

6. The process of claim 5, wherein the flow of the fluids is horizontal.

References Cited

UNITED STATES PATENTS

| 3,393,222 | 7/1968 | Schwarz et al. | 260—465 BX |
| 3,153,084 | 10/1964 | Veazey et al. | 260—465.2 |
| 3,481,969 | 12/1969 | Corsepius et al. | 260—465.2 |
| 2,955,130 | 10/1960 | Guyer et al. | 260—465.2 |
| 3,325,531 | 6/1967 | Glendinning et al. | 260—465.2 |
| 509,749 | 11/1893 | Morrell | 159—14 X |
| 1,067,010 | 5/1909 | Dunn | 159—14 |
| 2,519,618 | 8/1950 | Wilson et al. | 159—14 |
| 2,570,221 | 10/1951 | Cross | 159—13 A |
| 2,873,799 | 2/1959 | Earley et al. | 159—13 AX |
| 3,265,115 | 8/1966 | Maier | 159—13 C |

FOREIGN PATENTS

| 30,642 | 4/1907 | Austria | 159—14 |

JOSEPH PAUL BRUST, Primary Examiner

U.S. Cl. X.R.

159—13